United States Patent
Lee

(10) Patent No.: US 10,098,158 B2
(45) Date of Patent: Oct. 9, 2018

(54) WIRELESS DEVICE, BASE STATION, RANDOM ACCESS METHOD FOR WIRELESS DEVICE AND PREAMBLE CONFIGURATION METHOD FOR BASE STATION

(71) Applicant: Institute For Information Industry, Taipei (TW)

(72) Inventor: Kun-Hung Lee, Taipei (TW)

(73) Assignee: Institute For Information Industry, Taipei (TW)

( * ) Notice: Subject to any disclaimer, the term of this patent is extended or adjusted under 35 U.S.C. 154(b) by 156 days.

(21) Appl. No.: 15/352,155

(22) Filed: Nov. 15, 2016

(65) Prior Publication Data
US 2018/0124835 A1    May 3, 2018

(30) Foreign Application Priority Data
Nov. 1, 2016    (TW) .............................. 105135338 A

(51) Int. Cl.
*H04W 74/08*    (2009.01)
*H04B 1/3818*    (2015.01)
*H04W 48/10*    (2009.01)

(52) U.S. Cl.
CPC ...... *H04W 74/0833* (2013.01); *H04B 1/3818* (2015.01); *H04W 48/10* (2013.01)

(58) Field of Classification Search
CPC . H04W 74/0833; H04W 48/10; H04B 1/3818
See application file for complete search history.

(56) References Cited

U.S. PATENT DOCUMENTS

| | | | | |
|---|---|---|---|---|
| 2010/0275086 A1* | 10/2010 | Bergquist | .............. | H04L 1/1812 714/748 |
| 2016/0066264 A1* | 3/2016 | Miao | ................. | H04W 52/0206 370/311 |
| 2016/0174237 A1* | 6/2016 | Zhao | ................. | H04W 74/0833 370/329 |
| 2016/0270058 A1* | 9/2016 | Furuskog | .............. | H04L 1/0006 |
| 2016/0302235 A1* | 10/2016 | Hwang | ................. | H04W 74/08 |

* cited by examiner

*Primary Examiner* — Chirag Shah
*Assistant Examiner* — Joshua Smith
(74) *Attorney, Agent, or Firm* — Skaar Ulbrich Macari, P.A.

(57) ABSTRACT

A wireless device, a base station, a random access method and a preamble configuration method are provided. The mobile communication system defines a plurality of preambles, a plurality of low priority preamble sets, and a high priority preamble set. The low priority preamble sets have a strict partial order relationship therebetween. The high priority preamble set and the highest-order low priority preamble set are independent from each other. When requiring random access from a base station, the wireless device randomly selects a preamble from the low priority preamble sets to transmit a random access request message to the base station by using the selected preamble. When the request for random access fails, the wireless device with low priority randomly reselects a preamble from the higher-order low priority preamble set, and the wireless device with high priority randomly reselects a preamble from the high priority preamble set.

14 Claims, 7 Drawing Sheets

WIRELESS DEVICE, BASE STATION, RANDOM ACCESS METHOD FOR WIRELESS DEVICE AND PREAMBLE CONFIGURATION METHOD FOR BASE STATION

PRIORITY

This application claims priority to Taiwan Patent Application No. 105135338 filed on Nov. 1, 2016, which is hereby incorporated by reference in its entirety herein.

FIELD

The present invention relates to a wireless device for a mobile communication system, a base station, a random access method for a wireless device, and a preamble configuration method for a base station. More particularly, the mobile communication system of the present invention defines a plurality of low priority preamble sets having a strict partial order relationship therebetween and a high priority preamble set. As a result, the wireless device of the present invention can randomly select a preamble to be used in a random access procedure gradually from a low-order low priority preamble set to a high-order low priority preamble set based on a priority value assigned to the wireless device when the random access request fails, and further be capable of randomly selecting a preamble from the high priority preamble set when the wireless device has a high priority value.

BACKGROUND

With the rapid development of the wireless communication technology, people's demand for the communication through the user equipments (UEs), e.g., smart phones, tablet computers, etc., increases correspondingly. To meet users' requirements, new-generation mobile communication systems have been proposed one after the other, e.g., a long term evolution (LTE) communication system, a worldwide interoperability for microwave access (WiMAX) communication system and the like. In those mobile communication systems, the user equipment would perform a random access procedure to obtain radio resources for subsequent data transmission with the base station when it is just turned on, when its connection is interrupted or when it lost synchronization with the base station. During the random access procedure, the user equipment will transmit a random access request message on a specific channel learned from the broadcast message transmitted by the base station. The user equipment randomly selects a preamble from a plurality of preambles defined by the communication system, and generates the random access request message based on the selected preamble.

However, in recent years, except for common UEs, more and more wireless devices having the communication function of the mobile communication system have been manufactured, for example, internet of things (IoT) devices, wireless devices conforming to the machine type communication (MTC) specification or the like. Accordingly, when a large number of wireless devices (i.e., UEs, IoT devices, MTC devices, and wireless devices having the communication function of the mobile communication system) perform the random access procedure at the same time, it is easy for some wireless devices to select the same preamble since they all randomly select one preamble from the same preamble set, and consequently, the collision of preamble occurs among the random access request messages transmitted by those wireless devices.

In a case where the collision probability of preamble continuously increases with the increase of wireless devices, the wireless devices should randomly reselect a preamble once the collision of preamble occurs among the random access procedure and retransmit a random access request message. Those operations of randomly reselecting a preamble and retransmitting a random access request message will increase the time to successfully achieve the random access procedure, or even the wireless devices will stop the random access procedure when the number of failure reaches a system limit. As a result, the wireless devices may be unable to transmit data with the base, and radio resources in the base station may be idle as not being used.

Moreover, various wireless devices have different data transmission requirements. The UEs usually require instant data transmission, while part of IoT devices and MTC devices do not require instant data transmission. Therefore, the serious preamble collision will cause the UEs unable to instantly obtain resources for data transmission so as to make a bad impression on users.

Accordingly, how to provide a random access mechanism and a dynamic preamble set adjustment mechanism which can enhance the probability that wireless devices perform a random access procedure successfully, especially for UEs having instant data transmission requirement, in a case where the number of wireless devices continuously increases, and further prevent radio resources in the base station from becoming idle, is an urgent need in the art and in the industry.

SUMMARY

The disclosure includes a random access mechanism and a dynamic preamble set adjustment mechanism for a mobile communication system. The random access mechanism can divide a plurality of preambles defined by the mobile communication system into a plurality of low priority preamble sets and a high priority preamble set and make the low priority preamble sets have a strict partial order relationship therebetween. Meanwhile, the random access mechanism can further assign a priority value to each wireless device so that wireless devices would randomly select a preamble for the random access procedure from a low-order low priority preamble set to a high-order low priority preamble set gradually based on the priority value assigned to the wireless device when the random access request fails, especially for the wireless device with a high priority value to randomly select a preamble for the random access procedure from the high priority preamble set.

The base station of the dynamic preamble set adjustment mechanism can estimate the current environment condition to adjust the percentage of the number of preambles in the low priority preamble sets and in the high priority preamble set. In such a case that wireless devices have different priority values and consequently can use different preamble sets for performing a random access procedure, the random access mechanism and the dynamic preamble set adjustment mechanism of the present invention can effectively reduce the possibility that wireless devices select the same preamble at the same time and cause the preamble collision so as to prevent wireless devices with high priority from being influenced by wireless devices with low priority, and further increase the success probability of performing a random access procedure by the wireless devices to prevent radio resources in the base station from becoming idle.

The disclosure includes a wireless device for a mobile communication system. The mobile communication system defines a plurality of preambles, N number of low priority preamble sets, and a high priority preamble set. N is a positive integer, and each of the N number of low priority preamble sets has a part of the preambles. An $i^{th}$ low priority preamble set includes an $(i-1)^{th}$ low priority preamble set, and i is a positive integer and ranges from 2 to N. The high priority preamble set has a part of the preambles. A $N^{th}$ low priority preamble set is independent of the high priority preamble set and a union of the $N^{th}$ low priority preamble set and the high priority preamble set includes the preambles. The wireless device comprises a transceiver, a storage and a processor. The storage is configured to store the preambles, the N number of low priority preamble sets, the high priority preamble set and a priority value. The priority value represents a high priority or a low priority. The processor is electrically connected to the transceiver and the storage, and configured to determine whether the priority value represents the high priority or the low priority. The processor executes the following steps when the priority value represents the low priority: (a) randomly selecting a preamble from the $j^{th}$ low priority preamble set, j having an initial value of 1; (b) generating a random access request message according to the selected preamble; (c) transmitting the random access request message to a base station via the transceiver; (d) when a random access response message is not received from the base station via the transceiver within a preset time, determining whether j is equal to N and setting j=j+1 if j is not equal to N; and (e) after the step (d), repeatedly executing the above step (a) to step (d) until the random access response message is received from the base station or the number of transmission of the random access request message reaches a threshold. In addition, the processor performs the following steps when the priority value represents the high priority: (f) randomly selects a preamble from the $N^{th}$ low priority preamble set; (g) generating the random access request message according to the selected preamble; (h) transmitting the random access request message to the base station via the transceiver; (i) when the random access response message is not received from the base station via the transceiver within the preset time, randomly selecting a preamble from the high priority preamble set, generating the random access request message according to the selected preamble, and transmitting the random access request message to the base station via the transceiver; and (j) after the step (i), repeatedly executing the above step (i) until the random access response message is received from the base station or the number of transmission of the random access request message reaches the threshold.

The disclosure also includes a random access method for a wireless device. The wireless device is used for a mobile communication system. The mobile communication system defines a plurality of preambles, N number of low priority preamble sets, and a high priority preamble set. N is a positive integer, and each of the N number of low priority preamble sets has a part of the preambles. An $i^{th}$ low priority preamble set comprises an $(i-1)^{th}$ low priority preamble set, and i is a positive integer and ranges from 2 to N. The high priority preamble set has a part of the preambles. A $N^{th}$ low priority preamble set is independent of the high priority preamble set and a union of the $N^{th}$ low priority preamble set and the high priority preamble set includes the preambles. The wireless device comprises a transceiver, a storage and a processor. The storage is configured to store the preambles, the N number of low priority preamble sets, the high priority preamble set and a priority value. The priority value represents a high priority or a low priority. The random access method is executed by the processor and comprises the following steps: determining whether the priority value represents the high priority or the low priority. The random access method further comprises the following steps when the priority value represents the low priority: (a) randomly selecting a preamble from the $j^{th}$ low priority preamble set, j having an initial value of 1; (b) generating a random access request message according to the selected preamble; (c) transmitting the random access request message to a base station via the transceiver; (d) when a random access response message is not received from the base station via the transceiver within a preset time, determining whether j is equal to N, and setting j=j+1 if j is not equal to N; and (e) after the step (d), repeatedly performing the above steps (a) to (d) until the random access response message is received from the base station or the number of transmission of the random access request message reaches a threshold. The random access method further comprises the following steps when the priority value represents the high priority: (f) randomly selecting a preamble from the $N^{th}$ low priority preamble set; (g) generating the random access request message according to the selected preamble; (h) transmitting the random access request message to the base station via the transceiver; (i) when the random access response message is not received from the base station via the transceiver in the preset time, randomly selecting a preamble from the high priority preamble set, generating the random access request message according to the selected preamble, and transmitting the random access request message to the base station via the transceiver; and (j) after the step (i), repeatedly executing the above step (i) until the random access response message is received from the base station or the number of transmission of the random access request message reaches the threshold.

The disclosure further includes a base station for a mobile communication system. The mobile communication system defines a plurality of preambles, N number of low priority preamble sets, and a high priority preamble set. N is a positive integer, and each of the N number of low priority preamble sets has a part of the preambles. An $i^{th}$ low priority preamble set includes an $(i-1)^{th}$ low priority preamble set, and i is a positive integer and ranges from 2 to N. The high priority preamble set has a part of the preambles. A $N^{th}$ low priority preamble set is independent of the high priority preamble set and a union of the $N^{th}$ low priority preamble set and the high priority preamble set includes the preambles. The base station comprises a transceiver, a storage and a processor. The storage is configured to store the preambles, the N number of low priority preamble sets and the high priority preamble set. The processor is electrically connected to the transceiver and the storage, and configured to execute the following steps: dynamically adjusting a preamble number configuration ratio between the $N^{th}$ low priority preamble set and the high priority preamble set according to at least one user equipment with high priority and at least one user equipment with low priority connected to the base station; changing the N number of low priority preamble sets and the high priority preamble set according to the preamble number configuration ratio; generating a system message carrying the changed N number of low priority preamble sets and the changed high priority preamble set; and broadcasting the system message via the transceiver.

The disclosure additionally includes a preamble configuration method for a base station. The base station is used for a mobile communication system. The mobile communication system defines a plurality of preambles, N number of low priority preamble sets, and a high priority preamble set. N is a positive integer, and each of the N number of low priority preamble sets has a part of the preambles. An $i^{th}$ low priority preamble set includes an $(i-1)^{th}$ low priority preamble set, and i is a positive integer and ranges from 2 to N. The high priority preamble set has a part of the preambles. A $N^{th}$ low priority preamble set is independent of the high priority preamble set and a union of the $N^{th}$ low priority preamble set and the high priority preamble set includes the preambles. The base station comprises a transceiver, a storage and a processor. The storage is configured to store the preambles, the N number of low priority preamble sets and the high priority preamble set. The preamble configuration method is executed by the processor and comprises the following steps: dynamically adjusting a preamble number configuration ratio between the $N^{th}$ low priority preamble set and the high priority preamble set according to at least one user equipment with high priority and at least one user equipment with low priority connected to the base station; changing the N number of low priority preamble sets and the high priority preamble set according to the preamble number configuration ratio; generating a system message carrying the changed N number of low priority preamble sets and the changed high priority preamble set; and broadcasting the system message via the transceiver.

The detailed technology and preferred embodiments implemented for the present invention are described in the following paragraphs accompanying the appended drawings for people skilled in the art to well appreciate the features of the claimed invention.

DETAILED DESCRIPTION

In the following description, the present invention will be explained with reference to certain example embodiments thereof. The present invention relates to a wireless device and a base station for a mobile communication system, a random access method for a wireless device, and a preamble configuration method for a base station. It shall be appreciated that the example embodiments provided herein are not intended to limit the present invention to any particular example, embodiment, environment, applications or implementations described in these example embodiments. Therefore, description of these example embodiments is only for purpose of illustration rather than to limit the present invention, and the scope claimed in this application shall be governed by the claims.

Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1:
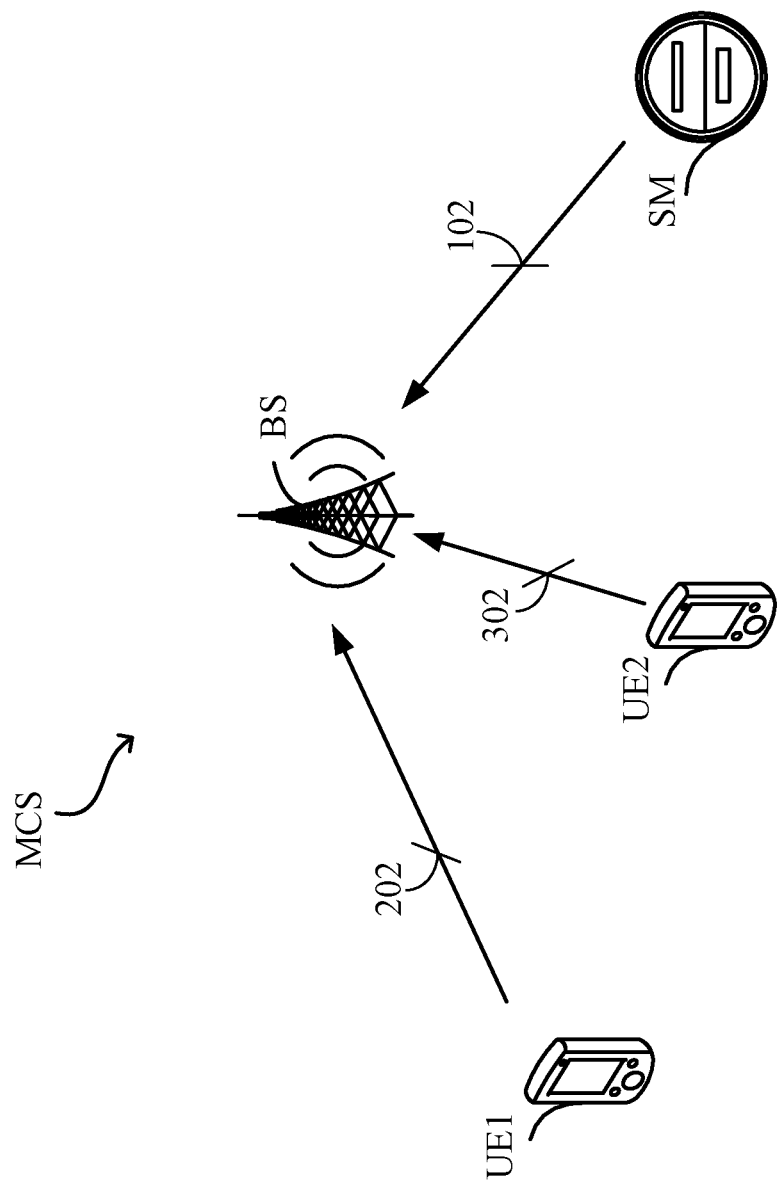
FIG. 1 is a schematic view of signal transmission between a user equipment UE1, a user equipment UE2 and a smart meter SM, and a base station BS in a mobile communication system MCS according to the present invention.

Please refer to FIG. 1 for a first embodiment of the present invention. FIG. 1 is a schematic view of signal transmission between a base station BS and a plurality of wireless devices (i.e., a user equipment UE1, a user equipment UE2 and a smart meter SM) in a mobile communication system MCS according to the present invention. The user equipment UE1 and the user equipment UE2 may be a smart phone, a tablet computer or any mobile communication device. The smart meter SM is a wireless device having the communication function of a mobile communication system MCS, which is usually fixedly mounted on a building to report the power consumption information. It shall be appreciated that the wireless device of the present invention is not limited to the user equipment UE1, the user equipment UE2 and the smart meter SM as described above, and it can be any wireless device as long as having the communication function of the mobile communication system MCS.

The mobile communication system MCS may be any mobile communication system which performs a random access procedure based on a preamble, e.g., a long term evolution (LTE) communication system and a worldwide interoperability for microwave access (WiMAX) communication system. The mobile communication system MCS defines a plurality of preambles. Taking an LTE communication system an example, the LTE communication system defines 64 preambles. And, the preambles may be generated based on a Zadoff-Chu sequence. The number of preambles in each mobile communication system and the way of generating the preambles are well-known in this art to which the present invention pertains, and thus will not be further described herein.

Compared with the mobile communication systems in the prior art, the mobile communication system of the present invention further divides the preambles into N number of low priority preamble sets and a high priority preamble set. N is a positive integer. Each of N number of low priority preamble sets has a part of the preambles, and the high priority preamble set also has a part of the preambles. The $i^{th}$ low priority preamble set comprises the $(i-1)^{th}$ low priority preamble set, where i is a positive integer and ranges from 2 to N. The $N^{th}$ low priority preamble set is independent of the high priority preamble set and a union of them includes the all preambles.

In other words, X number of preambles are divided into low priority preamble sets $B_1, B_2, B_3 \ldots, B_N$ (the N number of low priority preamble sets) and a high priority preamble set C. Each of low priority preamble sets $B_1, B_2, B_3 \ldots, B_N$ comprises a part of the X number of preambles, respectively. There are a strict partial order relationship among the low priority preamble sets $B_1, B_2, B_3 \ldots, B_N$. Similarly, the high priority preamble set C also comprises a part of the X number of preambles. The total set A includes the X number of preambles and the set B represents the union of the low priority preamble sets $B_1, B_2, B_3 \ldots, B_N$, and then the sets can be expressed in mathematical notation, as $A=B \cup C$, $B=B_1 \cup B_2 \cup B_3 \ldots \cup B_N$, $B_1 \subset B_2 \subset B_3 \ldots \subset B_N$, and $|B_1|<|B_2|<|B_3| \ldots <|B_N|$, where the set $B_N$ is equal to the set B.

By taking the LTE communication system an example, the mobile communication system MCS of the present invention can further divide 64 preambles of the LTE communication system into three low priority preamble sets (i.e., N=3) and a high priority preamble set. The low priority preamble set $B_1$ includes preambles Nos. 0-15, the low priority preamble set $B_2$ includes preambles Nos. 0-30, the low priority preamble set $B_3$ includes preambles Nos. 0-50, and the high priority preamble set C includes preambles Nos. 51-63, as shown in Table 1.

TABLE 1

| Preamble subset | Preamble No. |
| --- | --- |
| $B_1$ | 0-15 |
| $B_2$ | 0-30 |
| $B_3$ | 0-50 |
| C | 51-63 |

In addition, the mobile communication system MCS of the present invention further assigns a priority value to each wireless device. The priority value can represent a service level for the wireless device, i.e., a high priority value or a low priority value. The priority value is determined by the operator of the mobile communication system MCS when the user applies for a communication service for the wireless device. A wireless device with low priority (i.e., a wireless device with a low priority value) can use the low priority preamble sets $B_1$, $B_2$, $B_3$, and a wireless device with high priority (i.e., a wireless device with a high priority value) can use the low priority preamble set $B_3$ and the high priority preamble set C. Thus, the available preamble sets corresponding to each priority value are shown in Table 2.

TABLE 2

| Priority value | Available preamble sets |
| --- | --- |
| High priority value | Low priority preamble set $B_3$ and high priority preamble set C |
| Low priority value | Low priority preamble sets $B_1$, $B_2$, $B_3$ |

Usually, a wireless device requiring frequent communication services (e.g., the user equipment UE1, the user equipment UE2) would be the wireless device with high priority, while a wireless device requiring only regular communication services (e.g., the smart meter SM) would be a wireless device with low priority. Moreover, the priority value for a wireless device may be usually determined according to the service level or service charge applied by the user. A wireless device may read the priority value from the subscriber identity module (SIM) card mounted therein or obtain the priority value by other software and firmware writing modes, and store the priority value. A wireless device determines whether the wireless device belongs to a wireless device with high priority or a wireless device with low priority, by determining whether the priority value represents the high priority or the low priority.

In an implementation, a wireless device may receive a system message broadcast by the base station. The system message carries the N number of low priority preamble sets and a high priority preamble set. Thus, after receiving the system message, a wireless device may extract the N number of low priority preamble sets and the high priority preamble set from the system message, and store the N number of low priority preamble sets and the high priority preamble set. However, in another implementation, a wireless device may read the N number of low priority preamble sets and the high priority preamble set from the subscriber identity module (SIM) card mounted therein or obtain the priority value by other software and firmware writing modes, and store the N number of low priority preamble sets and the high priority preamble set.

When a wireless device with low priority initiates a random access procedure, the wireless device with low priority randomly selects a preamble from the $j^{th}$ low priority preamble set $B_j$, where j has an initial value of 1. Then, the wireless device with low priority generates a random access request message according to the selected preamble, and transmits the random access request message to the base station. When the wireless device with low priority does not receive a random access response message from the base station within a preset time, the wireless device with low priority determines whether j is equal to N. When j is not equal to N, j is set to j+1.

Afterwards, the wireless device repeats the foregoing operations (i.e., (i) randomly selecting a preamble from the $j^{th}$ low priority preamble set $B_j$; (ii) generating a random access request message according to the selected preamble; (iii) transmitting the random access request message to the base station; (iv) when the random access response message is not received from the base station, determining whether j is equal to N, and setting j=j+1 if j is not equal to N), until the random access response message is received from the base station or the number of transmission of the random access request message reaches a threshold. It shall be appreciated that the threshold is, but not limited thereto, set in accordance with specifications of each mobile communication system or set by the manufacturer of the wireless device according to practical requirements. The setting of the threshold may be readily understood by those skilled in the art, and thus will not be further described herein.

When a wireless device with high priority initiates a random access procedure, the wireless device with high priority randomly selects a preamble from the $N^{th}$ low priority preamble set $B_N$. Then, the wireless device with high priority generates a random access request message according to the selected preamble, and transmits the random access request message to the base station. When the wireless device with high priority does not receive a random access response message from the base station within a preset time, the wireless device with high priority randomly selects a preamble from the high priority preamble set C and generates a random access request message according to the selected preamble, and transmits the random access request message to the base station.

Afterwards, if the wireless device with high priority still does not receive a random access response message from the base station within the preset time, the wireless device repeats the forgoing operations (i.e., randomly selecting a preamble from the high priority preamble set C, generating the random access request message according to the selected preamble, and transmitting the random access request message to the base station), until a random access response message is received from the base station or the number of transmission of the random access request message reaches a threshold.

For example, when the priority value of the smart meter SM is a low priority value, the smart meter SM randomly selects a preamble from the low priority preamble set $B_1$ when initiating a random access procedure, and generates a random access request message 102 according to the selected preamble. Then, the smart meter SM transmits the random access request message 102 to the base station BS. When the preamble in the random access request message 102 collides with a preamble in a random access request message transmitted by another wireless device, the base station BS is unable to detect the preamble in the random access request message 102, and thus will not transmit a random access response message to the smart meter SM.

Thus, when there is no random access response message received from the base station BS within a preset time, the smart meter SM determines whether j is equal to N. Since the initial value of j is 1, the smart meter SM will set j=j+1.

Then, the smart meter SM randomly reselects a new preamble from the low priority preamble set $B_2$, regenerates a random access request message 102 according to the selected preamble, and transmits the random access request message 102 to the base station BS. If collision of preamble occurs again, the smart meter SM determines whether j is equal to N again. Since the current value of j is 2, the smart meter SM will set j=j+1. Next, the smart meter SM randomly reselects a new preamble from the low priority preamble set $B_3$, regenerates a random access request message 102 according to the selected preamble, and transmits the random access request message 102 to the base station BS.

If collision of preamble occurs again, since the current of j is 3 and j is equal to N, the smart meter SM will maintain j=3 instead of setting j=j+1. Then, the smart meter SM repeats the forgoing operations, until a random access response message is received from the base station or the number of transmission of the random access request message 102 reaches a threshold. If the smart meter SM receives a random access response message from the base station BS within the preset time (that is, no collision of preamble occurs), the smart meter SM continues to execute the subsequent operations of the random access procedure in response to the random access response message.

On the other hand, when the priority value of the user equipment UE1 is a high priority value, the user equipment UE1 randomly selects a preamble from the low priority preamble set $B_3$ when initiating a random access procedure, and generates a random access request message 202 according to the selected preamble. Then, the user equipment UE1 transmits the random access request message 202 to the base station BS. When the preamble in the random access request message 202 collides with a preamble in a random access request message transmitted by another wireless devices, the base station BS is unable to detect the preamble in the random access request message 202, and thus will not transmit a random access response message to the user equipment UE1. As a result, when there is no random access response message received from the base station BS within a preset time, the user equipment UE1 randomly reselects a new preamble from the high priority preamble set C, regenerates a random access request message 202 according to the selected preamble, and transmits the random access request message 202 to the base station BS.

If collision of preamble occurs again, the user equipment UE1 repeats the foregoing operations (i.e., randomly reselecting a new preamble from the high priority preamble set C, regenerating a random access request message 202 according to the selected preamble, and transmitting the random access request message 202 to the base station BS), until a random access response message is received from the base station BS or the number of transmission of the random access request message 202 reaches a threshold. If the user equipment UE1 receives a random access response message from the base station BS within the preset time (that is, no collision of preamble occurs), the user equipment UE1 continues to execute the subsequent operations of the random access procedure in response to the random access response message.

It can be known from the foregoing description that, since the wireless devices with different priority values randomly select a preamble from different preamble sets when performing the random access procedure, the random access mechanism of the present invention can reduce the possibility that wireless devices with high priority and wireless devices with low priority select the same preamble at the same time and cause the preamble collision so as to increase the success probability of performing a random access procedure by the wireless devices. In addition, with the occurrence of collision, wireless devices with low priority can be gradually allowed to use higher-order low priority preamble sets, and the probability of preamble collision may be reduced between the wireless devices with low priority. Thus, the random access mechanism adopts a code-domain backoff mechanism and specially reserves a high priority preamble set for wireless devices with high priority to reduce the probability of preamble collision.

It shall be appreciated that, in addition to the foregoing operations, other preamble collision mechanisms such as a time-domain backoff mechanism may be further applied to the random access mechanism of the present invention. In other words, when there is no random access response message received from the base station within a preset time, the wireless device randomly can generate a waiting time, randomly reselect a new preamble from the next preamble set after the waiting time expires, regenerate a random access request message according to the selected preamble, and transmit the random access request message.

The second embodiment of the present invention still refers to FIG. 1. In this embodiment, the high priority preamble set C may further comprise M number of high priority preamble subsets C1, $C_2$, ..., $C_M$. M is a positive integer, and each of the M number of high priority preamble subsets C1, $C_2$, ..., $C_M$ has a part of the high priority preamble set C. The $s^{th}$ high priority preamble subset comprises the $(s-1)^{th}$ high priority preamble subset, and s is a positive integer and ranges from 2 to M. The $M^{th}$ high priority preamble subset $C_M$ is equal to the high priority preamble set C. The sets can be expressed in mathematical notation, as $C=C_1 \cup C_2 \ldots \cup C_M$, $C_1 \subset C_2 \ldots \subset C_M$, $|C1|<|C2| \ldots <|C_M|$, and $C=C_M$.

Similarly, the M number of high priority preamble subsets C1, $C_2$, ..., $C_M$ may be read from the SIM card or obtained from the system message broadcast by the base station. When a wireless device with high priority initiates a random access procedure, the wireless device with high priority randomly selects a preamble from the $N^{th}$ low priority preamble set $B_N$. Then, the wireless device with high priority generates a random access request message according to the selected preamble, and transmits the random access request message to the base station. When the wireless device with high priority does not receive a random access response message from the base station within the preset time, the wireless device with high priority randomly selects a preamble from the $t^{th}$ high priority preamble subset, t having an initial value of 1. Next, the wireless device with high priority regenerates a random access request message according to the selected preamble, and transmits the random access request message to the base station.

If the wireless device with high priority still does not receive a random access response message from the base station within the preset time, the wireless device with high priority determines whether t is equal to M, and sets t=t+1 if t is not equal to M. Afterwards, the wireless device repeats the foregoing operations (i.e., randomly selecting a preamble from the $t^{th}$ high priority preamble subset; generating a random access request message according to the selected preamble; transmitting the random access request message to the base station; determining whether t is equal to M when there is no random access response message received from the base station, and setting t=t+1 if t is not equal to M), until a random access response message is received from the base station or the number of transmission of the random access request message reaches a threshold.

Taking the LTE communication system as an example, the mobile communication system MCS of the present invention can further divide 64 preambles of the LTE communication system into two low priority preamble sets (i.e., N=2) and a high priority preamble set. The low priority preamble set $B_1$ comprises preambles Nos. 0-10, the low priority preamble set $B_2$ comprises preambles Nos. 0-20, and the high priority preamble set C comprises preambles Nos. 21-63. The high priority preamble set C has three high priority preamble subsets $C_1$, $C_2$, $C_3$ (i.e., M=3). The high priority preamble subset $C_1$ comprises preambles Nos. 21-40, the high priority preamble subset $C_2$ comprises preambles Nos. 21-50, and the high priority preamble subset $C_3$ comprises preambles Nos. 21-63. Thus, the preambles included in the low priority preamble sets $B_1$, $B_2$ and the preambles included the high priority preamble subsets $C_1$, $C_2$, $C_3$ are shown in Table 3, and the available preamble sets or preamble subsets corresponding to each priority value are shown in Table 4.

TABLE 3

| Preamble subset | Preamble No. |
|---|---|
| $B_1$ | 0-10 |
| $B_2$ | 0-20 |
| $C_1$ | 21-40 |
| $C_2$ | 21-50 |
| $C_3$ | 21-63 |

TABLE 4

| Priority value | Available preamble sets/subsets |
|---|---|
| High priority value | Low priority preamble set $B_2$ and high priority preamble subsets $C_1$, $C_2$, $C_3$ |
| Low priority value | Low priority preamble sets $B_1$, $B_2$ |

When the priority value of the user equipment UE2 is a high priority value, the user equipment UE2 randomly selects a preamble from the low priority preamble set B2 when initiating a random access procedure, and generates a random access request message 302 according to the selected preamble. Then, the user equipment UE2 transmits the random access request message 302 to the base station BS. When the preamble in the random access request message 302 collides with a preamble in a random access request message transmitted by another wireless device, the base station BS is unable to detect the preamble in the random access request message 302, and thus will not transmit a random access response message to the user equipment UE2. As a result, when there is no random access response message received from the base station BS within a preset time, the user equipment UE2 randomly reselects a new preamble from the high priority preamble subset $C_1$ (t having an initial value of 1), regenerates a random access request message 302 according to the selected preamble, and transmits the random access request message 302 to the base station BS.

If collision of preamble occurs again, the user equipment UE2 determines whether t is equal to M. Since the initial value of t is 1, the user equipment UE2 will set t=t+1. Next, the user equipment UE2 randomly reselects a new preamble from the high priority preamble subset $C_2$, regenerates a random access request message 302 according to the selected preamble, and transmits the random access request message 302 to the base station BS. If collision of preamble occurs again, user equipment UE2 determines whether t is equal to M again. Since the current value of t is 2, the user equipment UE2 will set t=t+1. Then, the user equipment UE2 randomly selects a new preamble from the high priority preamble subset $C_3$, regenerates a random access request message 302 according to the selected preamble, and transmits the random access request message 302 to the base station BS.

Then, if collision of preamble occurs again, since the current value of t is 3 and t is equal to M, the user equipment UE2 will maintain t=3 instead of setting t=t+1. Afterwards, the user equipment UE2 repeats the forgoing operations, until a random access response message is received from the base station BS or the number of transmission of the random access request message 302 reaches the threshold. If the user equipment UE2 receives a random access response message from the base station BS within the preset time (that is, no collision of preamble occurs), the user equipment UE2 continues to execute the subsequent operations of the random access procedure in response to the random access response message.

It shall be appreciated that in the present invention, it is necessary for a wireless device to use a code-domain backoff mechanism for the high priority preamble set at the beginning after obtaining the N number of low priority preamble sets and the high priority preamble set C from the system message broadcast by the base station. The wireless device can use the code-domain backoff mechanism for the high priority preamble set when the system message broadcast by the base station BS carries an indication of enabling the M number of high priority preamble subsets $C_1$, $C_2$, ..., $C_M$ or carries the M number of high priority preamble subsets $C_1$, $C_2$, ..., $C_M$. In other words, the base station BS may broadcasts the system message which carries an enabling indication or carries the M number of high priority preamble subsets $C_1$, $C_2$, ..., $C_M$ after determining that the number of wireless devices with high priority to be served is higher than a threshold, in order to inform the wireless devices with high priority to perform a random access procedure based on the M number of high priority preamble subsets $C_1$, $C_2$, ..., $C_M$.

Figure 2:
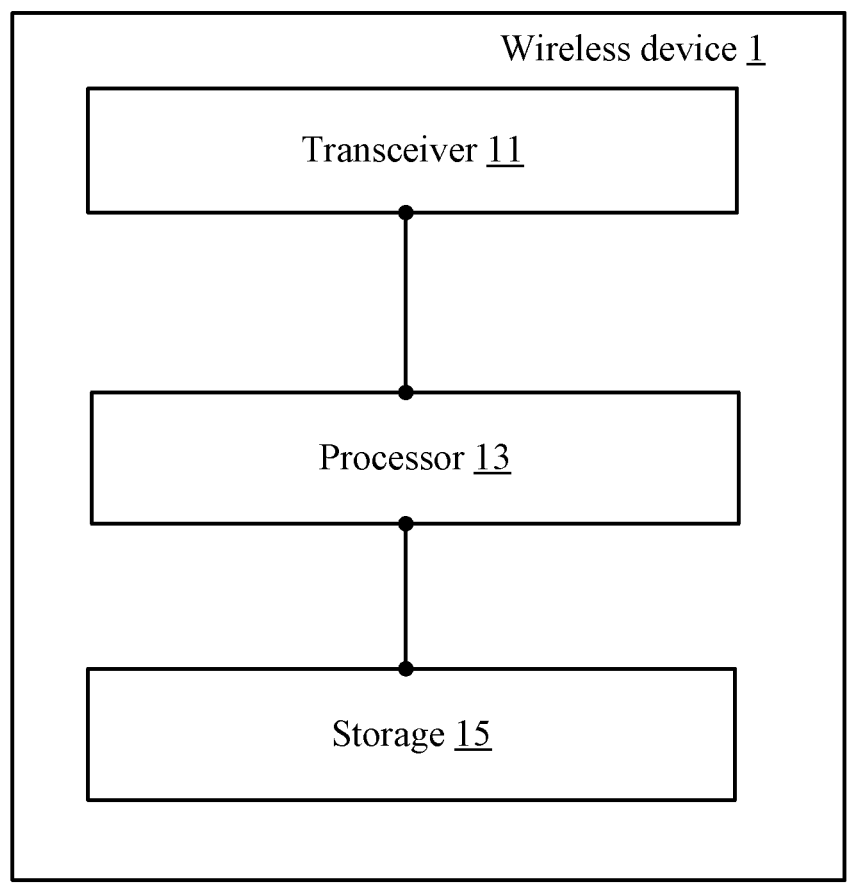
FIG. 2 is a schematic view of a wireless device 1 according to the present invention.

Please refer to FIG. 2 for the third embodiment of the present invention. FIG. 2 is a schematic view of a wireless device 1 of the present invention. The wireless device 1 is a wireless device having the communication function of the mobile communication system MCS, for example, one of the user equipment UE1, the user equipment UE2 and the smart meter SM in the first and second embodiments. As described above, the mobile communication system MCS defines a plurality of preambles, N number of low priority preamble sets, and a high priority preamble set. N is a positive integer, and each of the N number of low priority preamble sets has a part of the preambles. The $i^{th}$ low priority preamble set includes the $(i-1)^{th}$ low priority preamble set, and i is a positive integer and ranges from 2 to N. The high priority preamble set has a part of the preambles. A $N^{th}$ low priority preamble set is independent of the high priority preamble set and a union of the $N^{th}$ low priority preamble set and the high priority preamble set includes the all preambles.

The wireless device 1 comprises a transceiver 11, a processor 13 and a storage 15. The storage 15 is configured to store the preambles, the N number of low priority preamble sets, the high priority preamble set and a priority value. The priority value represents a high priority or a low priority. The processor 13 is electrically connected to the transceiver 11 and the storage 15, and configured to determine whether the priority value represents the high priority or the low priority.

When the priority value represents the low priority, the processor 13 executes the following steps: (a) randomly selecting a preamble from the $j^{th}$ low priority preamble set, j having an initial value of 1; (b) generating a random access request message according to the selected preamble; (c) transmitting the random access request message to a base station via the transceiver 11; (d) when there is no random access response message received from the base station via the transceiver 11 within a preset time, determining whether j is equal to N, and setting j=j+1 if j is not equal to N; and (e) after the step (d), repeatedly executing the above steps (a) to (d) until the random access response message is received from the base station or the number of transmission of the random access request message reaches a threshold.

In addition, when the priority value represents the high priority, the processor 13 executes the following steps: (f) randomly selecting a preamble from the $N^{th}$ low priority preamble set; (g) generating a random access request message according to the selected preamble; (h) transmitting the random access request message to the base station via the transceiver 11; (i) when there is no random access response message received from the base station via the transceiver 11 in the preset time, randomly selecting a preamble from the high priority preamble set, generating the random access request message according to the selected preamble, and transmitting the random access request message to the base station via the transceiver 11; and (j) after the step (i), repeatedly executing the above step (i) until the random access response message is received from the base station or the number of transmission of the random access request message reaches the threshold.

In an implementation, the processor 13 further receives a system message, which is broadcast by the base station, from the base station via the transceiver 11. The system message carries the information of the N number of low priority preamble sets and the high priority preamble set. Thus, after receiving the system message, the processor 13 may extract the N number of low priority preamble sets and the high priority preamble set from the system message, and store the N number of low priority preamble sets and the high priority preamble set in the storage 15. However, in another implementation, the wireless device 1 may further comprise an SIM card slot (now shown) electrically connected to the processor 13. The SIM card slot is used to receive an SIM card. Therefore, the processor 13 may read the N number of low priority preamble sets, the high priority preamble set and the priority value from the SIM card via the SIM card slot.

In addition, in another embodiment, the step (d) may further comprise the following step: randomly generating a waiting time when there is no random access response message received from the base station via the transceiver 11 within the preset time, and performing the step (e) when the waiting time expires. Similarly, the step (i) may further comprise the following step: randomly generating a waiting time when there is no random access response message received from the base station via the transceiver 11 within the preset time, and performing the step (j) when the waiting time expires. In other words, a time-domain backoff mechanism may be further added to the random access mechanism of the present invention.

In addition, in another embodiment, the high priority preamble set may further comprise M number of high priority preamble subsets. M is a positive integer, and each of the M number of high priority preamble subsets has a part of the high priority preamble set. The $s^{th}$ high priority preamble subset includes the $(s-1)^{th}$ high priority preamble subset, and s is a positive integer and ranges from 2 to M. The $M^{th}$ high priority preamble subset is equal to the high priority preamble set. In such the this embodiment, the step (i) further comprises the following steps: (i1) randomly selecting a preamble from the $t^{th}$ high priority preamble subset, t having an initial value of 1; (i2) generating a random access request message according to the selected preamble; (i3) transmitting the random access request message to the base station via the transceiver 11; (i4) when the random access response message is not received from the base station via the transceiver 11 within the preset time, determining whether t is equal to M, and setting t=t+1 if t is not equal to M; and (i5) after the step (i4), repeatedly executing the above steps (i1) to (i4) until the random access response message is received from the base station or the number of transmission of the random access request message reaches the threshold.

Figure 3:
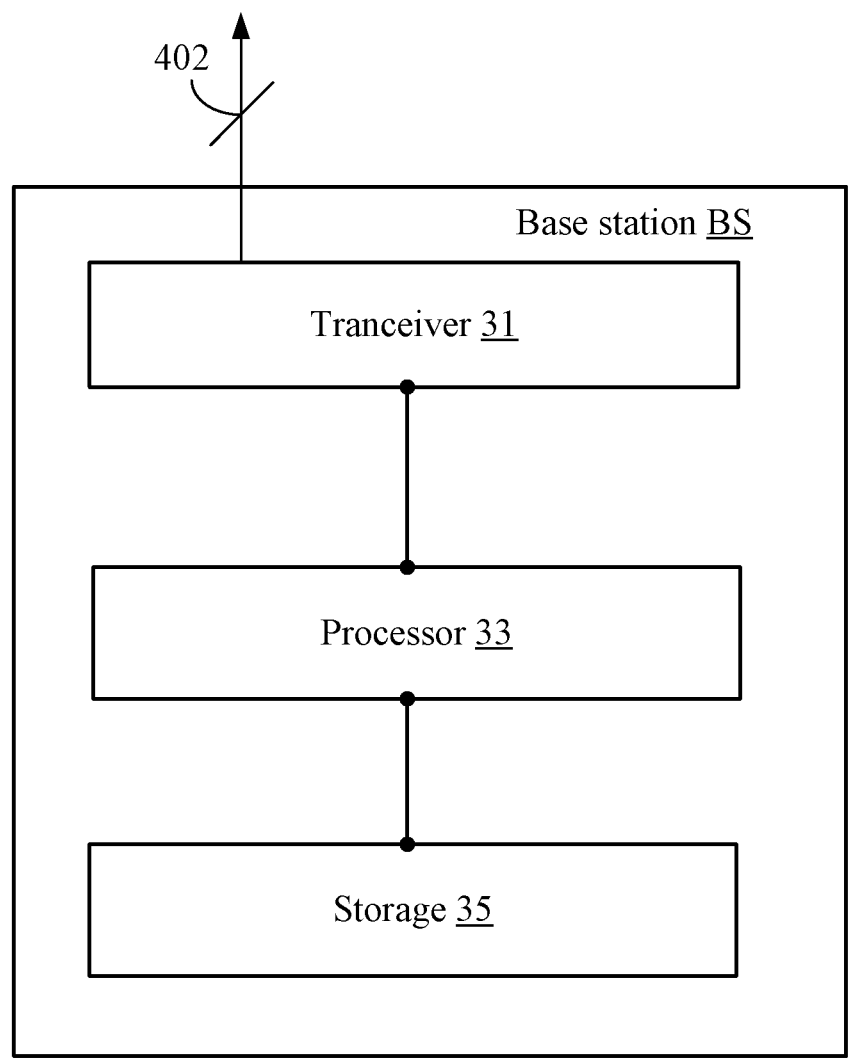
FIG. 3 is a schematic view of a base station BS according to the present invention.

Please refer to FIG. 3 for the fourth embodiment of the present invention. FIG. 3 is a schematic view of a base station BS of the present invention. The base station BS is used for the mobile communication system MCS, and comprises a transceiver 31, a processor 33 and a storage 35. The storage 35 is configured to store the preambles, the N number of low priority preamble sets and the high priority preamble set. The processor 33 is electrically connected to the transceiver 31 and the storage 35.

As described in the foregoing embodiments, the processor 33 broadcasts a system message 402 via the transceiver 31. The system message 402 carries the N number of low priority preamble sets and the high priority preamble set. Usually, the number of preambles included in each of the N number of low priority preamble sets and the number of preambles included the high priority preamble set will have an initial configuration. Afterwards, the processor 33 will dynamically adjust a preamble number configuration ratio between the $N^{th}$ low priority preamble set and the high priority preamble set according to at least one user equipment with high priority and at least one user equipment with low priority both connected to the base station.

For example, the processor 33 may dynamically adjust the preamble number configuration ratio according to a device number ratio between the at least one user equipment with high priority and the at least one user equipment with low priority. Specifically, if there are three user equipments with high priority and five user equipments with low priority, then the preamble number configuration ratio is 3:5. In this case, a union set B of the low priority preamble sets $B_1$, $B_2$, $B_3$ ..., $B_N$ includes 40 preamble $$\left(i.e., 64 \times \frac{5}{3+5} = 40\right),$$

e.g., includes preambles Nos. 0-39; and the high priority preamble set C includes 24 preambles $$\left(i.e., 64 \times \frac{3}{3+5} = 24\right),$$

e.g., includes preambles Nos. 40-63.

In another example, the processor 33 may dynamically adjust the preamble number configuration ratio according to a transmission number ratio for transmitting the random access request message between the at least one user equipment with high priority and the at least one user equipment with low priority. Specifically, if the number of transmission by user equipments with high priority is 5 and the number of transmissions by user equipments with low priority is 11, then the preamble number configuration ratio is 5:11. In this case, a union set B of the low priority preamble sets $B_1$, $B_2$, $B_3$ ..., $B_N$ includes 44 preambles $$\left(\text{i.e., } 64 \times \frac{11}{5+11} = 44\right),$$

e.g., includes preambles Nos. 0-43; and the high priority preamble set C includes 20 preambles $$\left(\text{i.e., } 64 \times \frac{5}{5+11} = 20\right),$$

e.g., includes preambles Nos. 44-63.

In another example, the processor 33 may dynamically adjust the preamble number configuration ratio according to both the device number ratio between the at least one user equipment with high priority and the at least one user equipment with low priority. If there are three user equipments with high priority and their number of transmission is 5, and five user equipments with low priority and their number of transmissions 11, then the preamble number configuration ratio is 15:55. In this case, a union set B of the low priority preamble sets $B_1$, $B_2$, $B_3$ ..., $B_N$ includes 50 preambles $$\left(\text{i.e., } 64 \times \frac{55}{15+55} \cong 50\right),$$

e.g., includes preambles Nos. 0-49; and the high priority preamble set C includes 14 preambles $$\left(\text{i.e., } 64 \times \frac{15}{15+55} \cong 14\right),$$

e.g., includes preambles Nos. 50-63.

Then, the processor 33 changes the N number of low priority preamble sets and the high priority preamble set according to the preamble number configuration ratio, and generates a new system message 402. The new system message 402 carries the changed N number of low priority preamble sets and the changed high priority preamble set. Then, the processor 33 broadcasts the system message 402 via the transceiver 31. In addition, in another embodiment, the high priority preamble set C further comprises M number of high priority preamble subsets C1, $C_2$, ..., $C_M$. Therefore, the system message 304 further carries the M number of high priority preamble subsets.

In addition, in another embodiment where there is a limited number of wireless devices with high priority (that is, there are few wireless devices with high priority), the processor 33 may further assign a particular preamble in the high priority preamble set C to one of the at least one user equipment with high priority. For example, the processor 33 may assign a preamble No. 62 to the user equipment UE1 and a preamble No. 63 to the user equipment UE2, and inform the user equipment UE1 and the user equipment UE2 by the system message 304. In addition, the processor 33 may assign a preamble No. 62 to both the user equipment UE1 and the user equipment UE2, and a preamble No. 63 to other two wireless devices with high priority. In other words, the processor 33 may assign a particular preamble to one or more wireless devices with high priority.

It shall be appreciated that the base station BS of the present invention may periodically (for example, per 10 minutes, per 30 minutes, per hour, etc.) executes the aforesaid steps to adjust the preamble number configuration ratio, so that the configuration of preambles meets to the practical environment condition (i.e., the device number ratio of user equipments with high priority and user equipments with low priority, the transmission number ratio, etc.) as much as possible. In addition, except for adjusting the preamble number configuration ratio according to the real-time environment condition, the preamble number configuration ratio may be further adjusted based on the statistical analysis of the environment situation in a time interval. Therefore, the dynamic preamble set adjustment mechanism of the present invention can allow the base station to adjust a ratio of the low priority preamble sets between the high priority preamble set according to the practical environment condition.

Figure 4A:
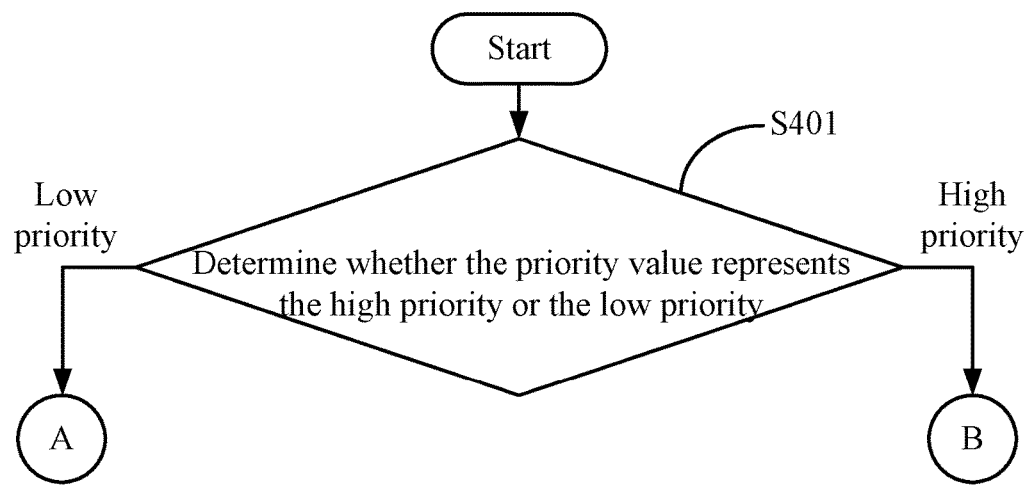
FIGS. 4A-4C are flowchart diagrams of a random access method according to the present invention.
Figure 4B:
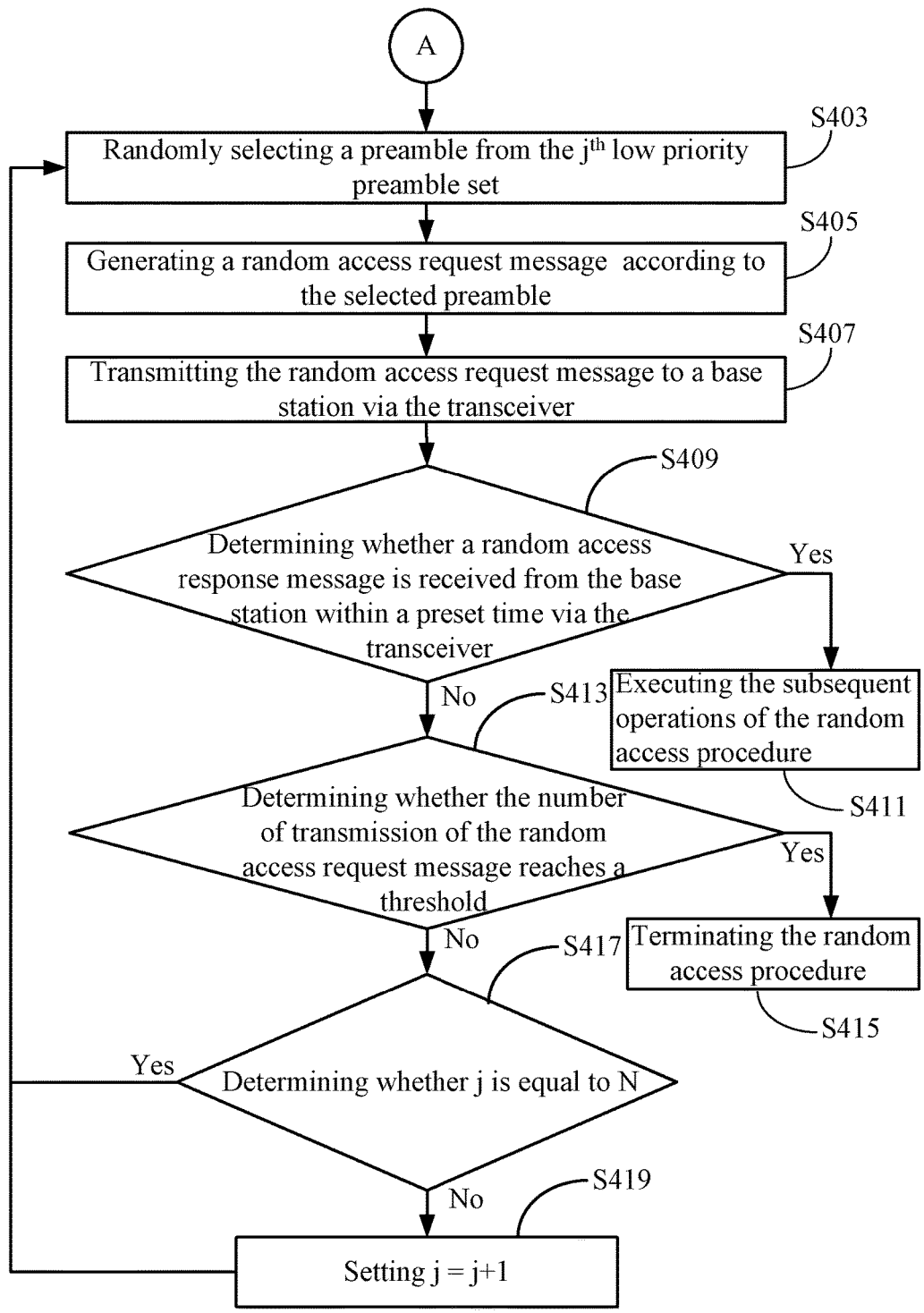
Figure 4C:
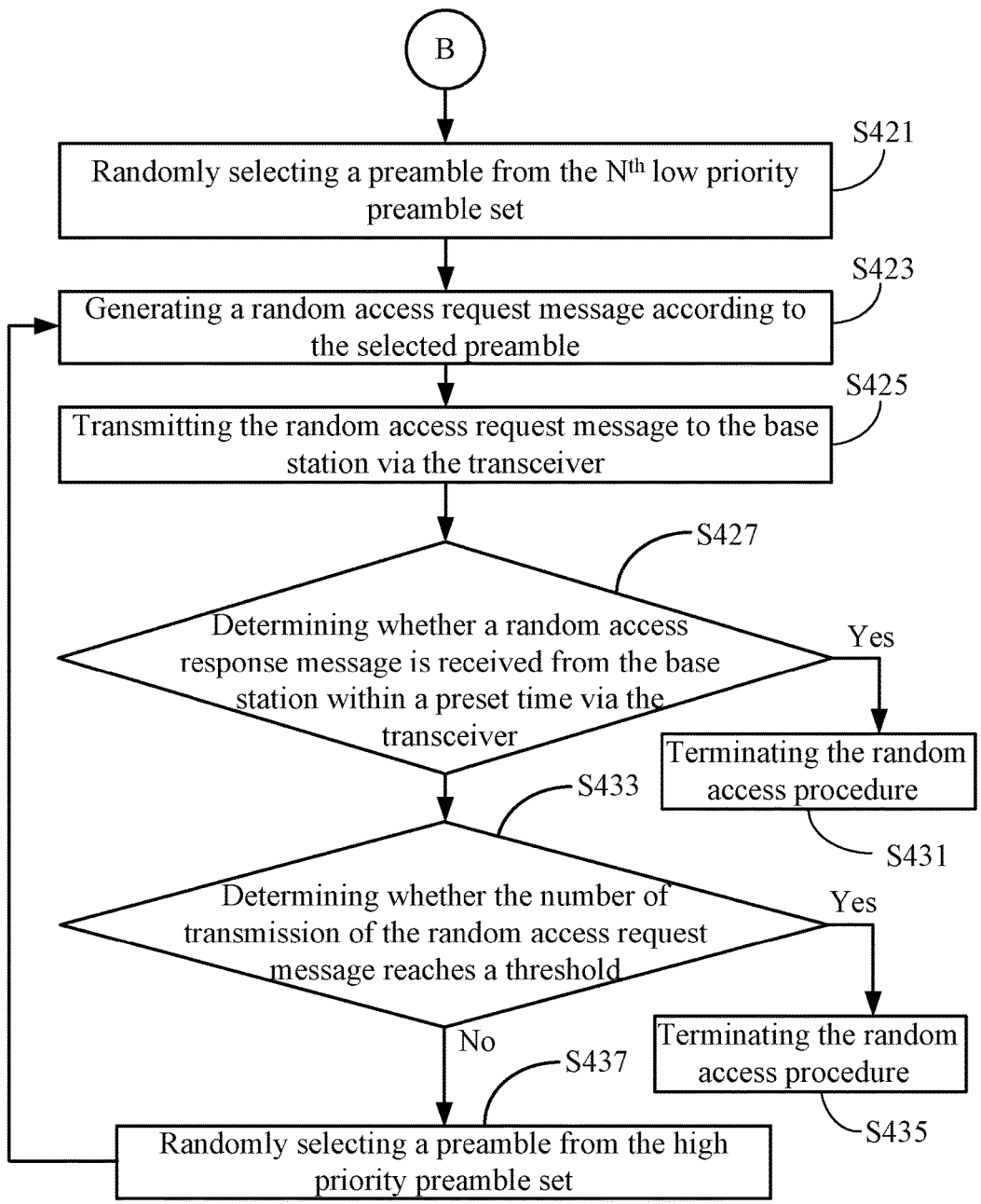

Please refer to FIGS. 4A-4C for the fifth embodiment of the present invention. FIGS. 4A-4C are flowcharts of a random access method of the present invention. The random access method of the present invention is adapted for use in a wireless device in a mobile communication system (for example, the wireless device 1 in the mobile communication system MCS as described above). The mobile communication system defines a plurality of preambles, N number of low priority preamble sets, and a high priority preamble set. N is a positive integer, and each of the N number of low priority preamble sets has a part of the preambles. The $i^{th}$ low priority preamble set includes the $(i-1)^{th}$ low priority preamble set, and i is a positive integer and ranges from 2 to N. The high priority preamble set has a part of the preambles. A $N^{th}$ low priority preamble set is independent of the high priority preamble set and a union of the $N^{th}$ low priority preamble set and the high priority preamble set includes the all preambles. The wireless device comprises a transceiver, a storage and a processor. The storage is configured to store the preambles, the N number of low priority preamble sets, the high priority preamble set and a priority value. The priority value represents a high priority or a low priority. The random access method is executed by the processor.

First, step S401 is executed to determine whether the priority value represents the high priority or the low priority. When the priority value represents high priority, step S403 is executed to randomly select a preamble from the $j^{th}$ low priority preamble set, j having an initial value of 1. Then, in step S405, a random access request message is generated according to the selected preamble. Then, in step S407, the random access request message is transmitted to a base station via the transceiver.

Next, step S409 is executed to determine whether a random access response message is received from the base station via the transceiver within a preset time. When a random access response message is received, step S411 is executed to execute the subsequent operations of the random access procedure. By contract, when there is no random access response message received from the base station within a preset time via the transceiver, step S413 is executed to determine whether the number of transmission of the random access request message reaches a threshold. If "Yes" in step S413, step S415 is executed to terminate the random access procedure. Moreover, if "No" in step S413, step S417 is executed to determine whether j is equal to N. Next, when j is not equal to N, step S419 is executed to set j=j+1, and then the flow returns back to step S403. On the other hand, when j is equal to N, it returns back to step S403.

On the other hand, when the priority value represents the high priority, step S421 is executed to randomly select a preamble from the $N^{th}$ low priority preamble set. Then, in step S423, a random access request message is generated according to the selected preamble. Next, in step S425, the random access request message is transmitted to the base station via the transceiver. Afterwards, step S427 is executed to determine whether a random access response message is received from the base station via the transceiver within a preset time. If a random access response message is received, then step S431 is executed to execute the subsequent operations of the random access procedure.

By contrast, if there is no random access response message received from the base station within a preset time via the transceiver, step S433 is executed to determine whether the number of transmission of the random access request message reaches a threshold. If "Yes" in step 433, step S435 is executed to terminate the random access procedure. If "No" in step 433, then step S437 is executed to randomly select a preamble from the high priority preamble set. Then, the flow returns back to step S423.

In another embodiment, the high priority preamble set may further comprise M number of high priority preamble subsets. M is a positive integer, and each of the M number of high priority preamble subsets has a part of the high priority preamble set. The $s^{th}$ high priority preamble subset comprises the $(s-1)^{th}$ high priority preamble subset, and s is a positive integer and ranges from 2 to M. The $M^{th}$ high priority preamble subset is equal to the high priority preamble set. In such the embodiment, the random access method of the present invention further comprises the following steps: (i1) randomly selecting a preamble from the $t^{th}$ high priority preamble subset, t having an initial value of 1; (i2) generating a random access request message according to the selected preamble; (i3) transmitting the random access request message to the base station via the transceiver; (i4) when the random access response message is not received from the base station within the preset time via the transceiver, determining whether t is equal to M, and setting t=t+1 if t is not equal to M; and (i5) after the step (i4), repeatedly performing the above steps (i1) to (i4) until the random access response message is received from the base station or the number of transmission of the random access request message reaches the threshold.

In another embodiment, the random access method of the present invention may further comprise the following step: receiving a system message, which is broadcast by the base station, from the base station via the transceiver. The system message carries the N number of low priority preamble sets and the high priority preamble set. In addition, in another embodiment, in which the wireless device further comprises an SIM card slot electrically connected to the processor and the SIM card slot receives an SIM card, the random access method of the present invention further comprises the following step: reading the N number of low priority preamble sets, the high priority preamble set and the priority value from the SIM card via the SIM card slot.

Moreover, in another embodiment, after determining that the number of transmission of the random access request message does not reach the threshold in step S413, the random access method of the present invention further comprises: randomly generating a waiting time, and returning back to step S403 when the waiting time expires. It shall be appreciated that, in such the embodiment, step S417 and step S419 may be executed during the waiting time. Similarly, after determining that the number of transmissions of the random access request message does not reach the threshold in step S437, the random access method of the present invention may further comprises: randomly generating a waiting time, and executing step S437 when the waiting time expires.

In addition to the aforesaid steps, the random access method of the present invention can also execute all the operations and have all the corresponding functions set forth in all the aforesaid embodiments. How this embodiment executes these operations and has these functions will be readily appreciated by those of ordinary skill in the art based on the explanation of all the aforesaid embodiments, and thus will not be further described herein.

Figure 5:
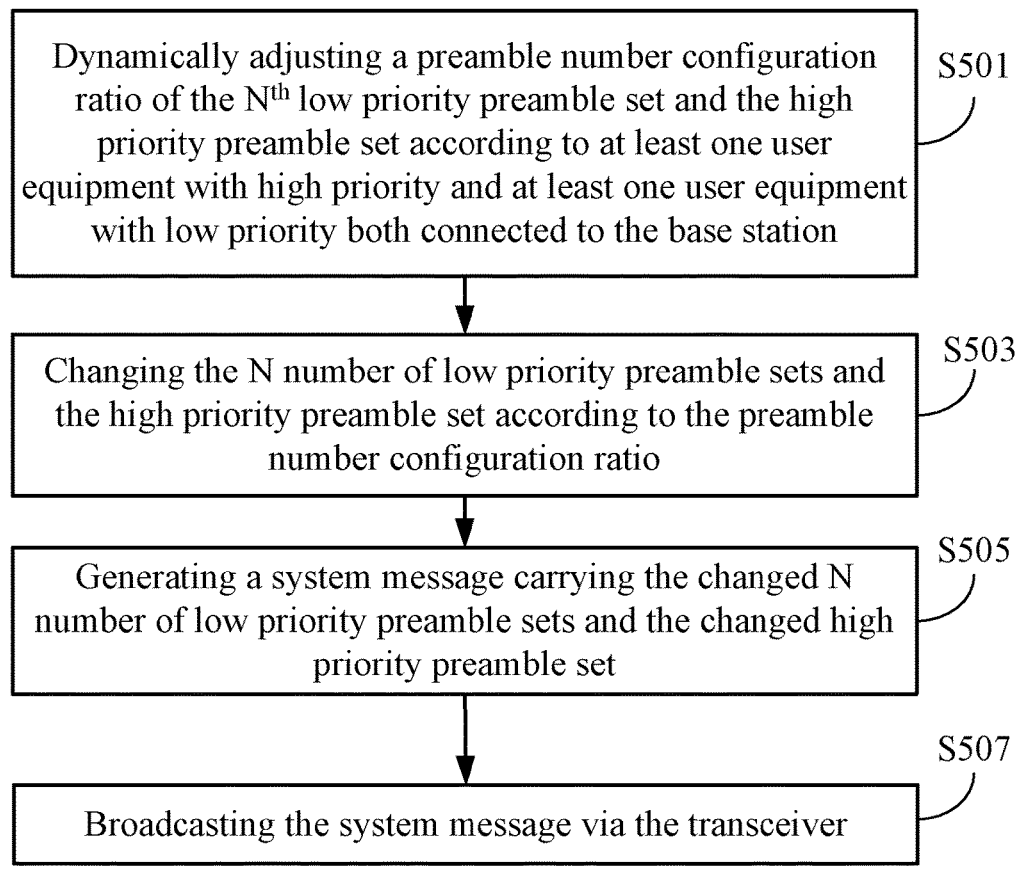
FIG. 5 is a flowchart diagram of a preamble configuration method according to the present invention.

The sixth embodiment of the present invention refers to FIG. 5. FIG. 5 is a flowchart of a preamble configuration method of the present invention. The preamble configuration method of the present invention is adapted for use in a base station in a mobile communication system (for example, the base station BS in the mobile communication system MCS as described above). The mobile communication system defines a plurality of preambles, N number of low priority preamble sets, and a high priority preamble set. N is a positive integer, and each of the N number of low priority preamble sets has a part of the preambles. The $i^{th}$ low priority preamble set includes the $(i-1)^{th}$ low priority preamble set, and i is a positive integer and ranges from 2 to N. The high priority preamble set has a part of the preambles. The $N^{th}$ low priority preamble set is independent of the high priority preamble set and the union of the $N^{th}$ low priority preamble set and the high priority preamble set includes all the preambles. The base station comprises a transceiver, a storage and a processor. The storage is configured to store the preambles, the N number of low priority preamble sets and the high priority preamble set. The preamble configuration method is executed by the processor.

First, in step S501, a preamble number configuration ratio of the $N^{th}$ low priority preamble set and the high priority preamble set is dynamically adjusted according to at least one user equipment with high priority and at least one user equipment with low priority both connected to the base station. Then, in step S503, the N number of low priority preamble sets and the high priority preamble set are changed according to the preamble number configuration ratio. Next, in step S505, a system message is generated which carries the changed N number of low priority preamble sets and the changed high priority preamble set. Then, in step S507, the system message is broadcast via the transceiver.

In addition to the aforesaid steps, the preamble configuration method of the present invention can also execute all the operations and have all the corresponding functions set forth in all the aforesaid embodiments. How this embodiment executes these operations and has these functions will be readily appreciated by those of ordinary skill in the art based on the explanation of all the aforesaid embodiments, and thus will not be further described herein.

According to the above descriptions, the random access mechanism of the present invention can make the wireless devices with different priority values randomly select a preamble from different preamble sets when performing a random access procedure. Thus, it can reduce the possibility that wireless devices with high priority and wireless devices with low priority select the same preamble at the same time and cause the preamble collision so as to increase the success probability of performing a random access procedure by the wireless devices. In addition, the wireless devices with low priority can be gradually allowed to use higher-order low priority preamble sets with the collision occurs, and so the probability of preamble collision may be reduced among the wireless devices with low priority. Moreover, the dynamic preamble set adjustment mechanism of the present invention make the base station adjust a ratio between the low priority preamble sets and the high priority preamble set according to the practical environment condition. Therefore, compared with the conventional mobile communication systems, the mobile communication system of the present invention can effectively reduce the possibility that wireless devices select the same preamble so as to increase the success probability of performing a random access procedure by the wireless devices and prevent radio resources in the base station from becoming idle.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless device for a mobile communication system, the mobile communication system defining a plurality of preambles, N number of low priority preamble sets and a high priority preamble set, N being a positive integer, each of the N number of low priority preamble sets having a part of the preambles, an $i^{th}$ low priority preamble set including an $(i-1)^{th}$ low priority preamble set, i being a positive integer and ranging from 2 to N, the high priority preamble set having a part of the preambles, a $N^{th}$ low priority preamble set being independent of the high priority preamble set, a union of the $N^{th}$ low priority preamble set and the high priority preamble set including the preambles, the wireless device comprising:
   a transceiver;
   a storage, being configured to store the preambles, the N number of low priority preamble sets, the high priority preamble set and a priority value, the priority value representing a high priority or a low priority; and
   a processor, being electrically connected to the transceiver and the storage, and configured to determine whether the priority value represents the high priority or the low priority, and to execute the following steps when the priority value represents the low priority:
   (a) randomly selecting a preamble from the $j^{th}$ low priority preamble set, j having an initial value of 1;
   (b) generating a random access request message according to the selected preamble;
   (c) transmitting the random access request message to a base station via the transceiver;
   (d) when a random access response message is not received from the base station within a preset time via the transceiver, determining whether j is equal to N, and setting j=j+1 if j is not equal to N;
   (e) after the step (d), repeatedly executing the above steps (a) to (d) until the random access response message is received from the base station or a number of transmissions of the random access request message reaches a threshold; and
   (f) transmitting data through a radio resource indicated in the random access response message if the random access response message is received from the base station;
   wherein, when the priority value represents the high priority, the processor executes the following steps:
   (g) randomly selecting a preamble from the $N^{th}$ low priority preamble set;
   (h) generating the random access request message according to the selected preamble;
   (i) transmitting the random access request message to the base station;
   (j) when the random access response message is not received from the base station via the transceiver within the preset time, randomly selecting a preamble from the high priority preamble set, generating the random access request message according to the selected preamble, and transmitting the random access request message to the base station via the transceiver;
   (k) after the step (j), repeatedly executing the above step (j) until the random access response message is received from the base station or the number of transmissions of the random access request message reaches the threshold; and
   (l) transmitting the data through the radio resource indicated in the random access response message if the random access response message is received from the base station.

2. The wireless device of claim 1, wherein the processor further receives a system message, which is broadcast by the base station, from the base station via the transceiver, and the system message carries the N number of low priority preamble sets and the high priority preamble set.

3. The wireless device of claim 1, wherein the high priority preamble set further comprises M number of high priority preamble subsets, M is a positive integer, each of the M number of high priority preamble subsets has a part of the high priority preamble set, a $s^{th}$ high priority preamble subset includes a $(s-1)^{th}$ high priority preamble subset, s is a positive integer and ranges from 2 to M, an $M^{th}$ high priority preamble subset is equal to the high priority preamble set; and the step (j) further comprises the following steps:
   (j1) randomly selecting a preamble from the $t^{th}$ high priority preamble subset, t having an initial value of 1;
   (j2) generating the random access request message according to the selected preamble;
   (j3) transmitting the random access request message to the base station via the transceiver;
   (j4) when the random access response message is not received via the transceiver from the base station within the preset time, determining whether t is equal to M, and setting t=t+1 if t is not equal to M; and
   (j5) after the step (j4), repeatedly executing the above steps (j1) to (j4) until the random access response message is received from the base station or the number of transmission of the random access request message reaches the threshold.

4. The wireless device of claim 1, further comprising a subscriber identity module (SIM) card slot electrically connected to the processor, wherein the SIM card slot is configured to receive an SIM card; and the processor reads the N number of low priority preamble sets, the high priority preamble set and the priority value from the SIM card via the SIM card slot.

5. The wireless device of claim 1, wherein the step (d) further comprises the following step:
randomly generating a waiting time when the random access response message is not received from the base station via the transceiver within the preset time, and executing the step (e) when the waiting time expires.

6. The wireless device of claim 1, wherein the step (j) further comprises the following step:
randomly generating a waiting time when the random access response message is not received from the base station via the transceiver within the preset time, and executing the step (k) when the waiting time expires.

7. The wireless device of claim 1, wherein the mobile communication system is a long term evolution (LTE) communication system, and the number of the preambles is 64.

8. A random access method for a wireless device, the wireless device being used for a mobile communication system, the mobile communication system defining a plurality of preambles, N number of low priority preamble sets and a high priority preamble set, N being a positive integer, each of the N number of low priority preamble sets having a part of the preambles, an $i^{th}$ low priority preamble set including an $(i-1)^{th}$ low priority preamble set, i being a positive integer and ranging from 2 to N, the high priority preamble set having a part of the preambles, a $N^{th}$ low priority preamble set being independent of the high priority preamble set, a union of the $N^{th}$ low priority preamble set and the high priority preamble set including the preambles, the wireless device comprising a transceiver, a storage and a processor, the storage being configured to store the preambles, the N number of low priority preamble sets, the high priority preamble set and a priority value, the priority value representing a high priority or a low priority, the random access method being executed by the processor and comprising:
determining whether the priority value represents the high priority or the low priority;
when the priority value represents the low priority, further comprising:
(a) randomly selecting a preamble from the $j^{th}$ low priority preamble set, j having an initial value of 1;
(b) generating a random access request message according to the selected preamble;
(c) transmitting the random access request message to a base station via the transceiver;
(d) when a random access response message is not received from the base station via the transceiver within a preset time, determining whether j is equal to N, and setting j=j+1 if j is not equal to N;
(e) after the step (d), repeatedly executing the above steps (a) to (d) until the random access response message is received from the base station or a number of transmissions of the random access request message reaches a threshold; and
(f) transmitting data through a radio resource indicated in the random access response message if the random access response message is received from the base station;
when the priority value represents the high priority, further comprising:
(g) randomly select a preamble from the $N^{th}$ low priority preamble set;
(h) generating the random access request message according to the selected preamble;
(i) transmitting the random access request message to the base station via the transceiver;
(j) when the random access response message is not received from the base station via the transceiver within the preset time, randomly selecting a preamble from the high priority preamble set, generating the random access request message according to the selected preamble, and transmitting the random access request message to the base station via the transceiver;
(k) after the step (j), repeatedly executing the above step (j) until the random access response message is received from the base station or the number of transmissions of the random access request message reaches the threshold; and
(l) transmitting the data through the radio resource indicated in the random access response message if the random access response message is received from the base station.

9. The random access method of claim 8, wherein the processor further receives a system message, which is broadcast by the base station, from the base station via the transceiver, the system message carries the N number of low priority preamble sets and the high priority preamble set.

10. The random access method of claim 8, wherein the high priority preamble set further comprises M number of high priority preamble subsets, M is a positive integer, each of the M number of high priority preamble subsets has a part of the high priority preamble set, a $s^{th}$ high priority preamble subset includes a $(s-1)^{th}$ high priority preamble subset, s is a positive integer and ranges from 2 to M, an $M^{th}$ high priority preamble subset is equal to the high priority preamble set, and the step (j) further comprises:
(j1) randomly selecting a preamble from the $t^{th}$ high priority preamble subset, t having an initial value of 1;
(j2) generating the random access request message according to the selected preamble;
(j3) transmitting the random access request message to the base station via the transceiver;
(j4) when the random access response message is not received from the base station within the preset time via the transceiver, determining whether t is equal to M, and setting t=t+1 when t is not equal to M; and
(j5) after the step (j4), repeatedly executing the above steps (j1) to (j4) until the random access response message is received from the base station or the number of transmission of the random access request message reaches the threshold.

11. The random access method of claim 8, wherein the wireless device further comprises a subscriber identity module (SIM) card slot electrically connected to the processor, the SIM card slot is configured to receive an SIM card, and the random access method further comprises:
reading the N number of low priority preamble sets, the high priority preamble set and the priority value from the SIM card via the SIM card slot.

12. The random access method of claim 8, wherein the step (d) further comprises:
randomly generating a waiting time when the random access response message is not received from the base station in the preset time via the transceiver, and executing the step (e) when the waiting time expires.

13. The random access method of claim 8, wherein the step (j) further comprises:
   randomly generating a waiting time when the random access response message is not received from the base station via the transceiver within the preset time, and executing the step (k) when the waiting time expires.

14. The random access method of claim 8, wherein the mobile communication system is a long term evolution (LTE) communication system, and the number of the preambles is 64.

\* \* \* \* \*